United States Patent [19]

Nakatani et al.

[11] Patent Number: 5,136,372
[45] Date of Patent: Aug. 4, 1992

[54] COLOR IMAGE FORMING METHOD AND APPARATUS FOR IMPROVED IMAGE COLOR REPRODUCIBILITY

[75] Inventors: Munehiro Nakatani; Hiroya Sugawa; Masamichi Kishi, all of Osaka, Japan

[73] Assignee: Minolta Camera Kabushiki Kaisha, Osaka, Japan

[21] Appl. No.: 406,138

[22] Filed: Sep. 12, 1989

[30] Foreign Application Priority Data

Sep. 12, 1988 [JP] Japan ................................ 63-228120

[51] Int. Cl.⁵ ............................................... G03F 3/08
[52] U.S. Cl. ........................................ 358/80; 355/326
[58] Field of Search .................. 355/218, 326, 327; 358/75, 467, 443, 79, 80, 448

[56] References Cited

U.S. PATENT DOCUMENTS

| | | | |
|---|---|---|---|
| 4,194,221 | 3/1980 | Stoffel | 358/456 |
| 4,623,917 | 11/1986 | Noguchi . | |
| 4,655,579 | 4/1987 | Adachi et al. . | |
| 4,711,553 | 12/1987 | Watanabe | 358/75 X |
| 4,737,821 | 4/1988 | Suzuki et al. | 355/326 |
| 4,794,421 | 12/1988 | Stoudt et al. | 355/218 X |
| 4,809,063 | 2/1989 | Moriguchi et al. | 358/75 |
| 4,812,899 | 3/1989 | Kueppers | 358/75 |

FOREIGN PATENT DOCUMENTS 58-34677 3/1983 Japan .
58-48571 3/1983 Japan .
61-13262 1/1986 Japan .

*Primary Examiner*—Fred L. Braun
*Attorney, Agent, or Firm*—Price, Gess & Ubell

[57] ABSTRACT

An image forming apparatus for forming a color image in a plurality of colors including a plurality of image forming units which are different in image forming color from each other, a spatial frequency detector for detecting a spatial frequency relating to an image of a prescribed color for every portion of an image to be formed, and a control unit for controlling the image forming units to perform image formation by one of the image forming units in a portion belonging to that having a high spatial frequency within portions to be subjected to image formation in the prescribed color while performing image formation by overlapping a plurality of colors through at least two of the image forming units in a portion belonging to that having a low spatial frequency on the basis of a detection output from the spatial frequency detector. Method steps for improving image color reproducibility are also described.

10 Claims, 8 Drawing Sheets

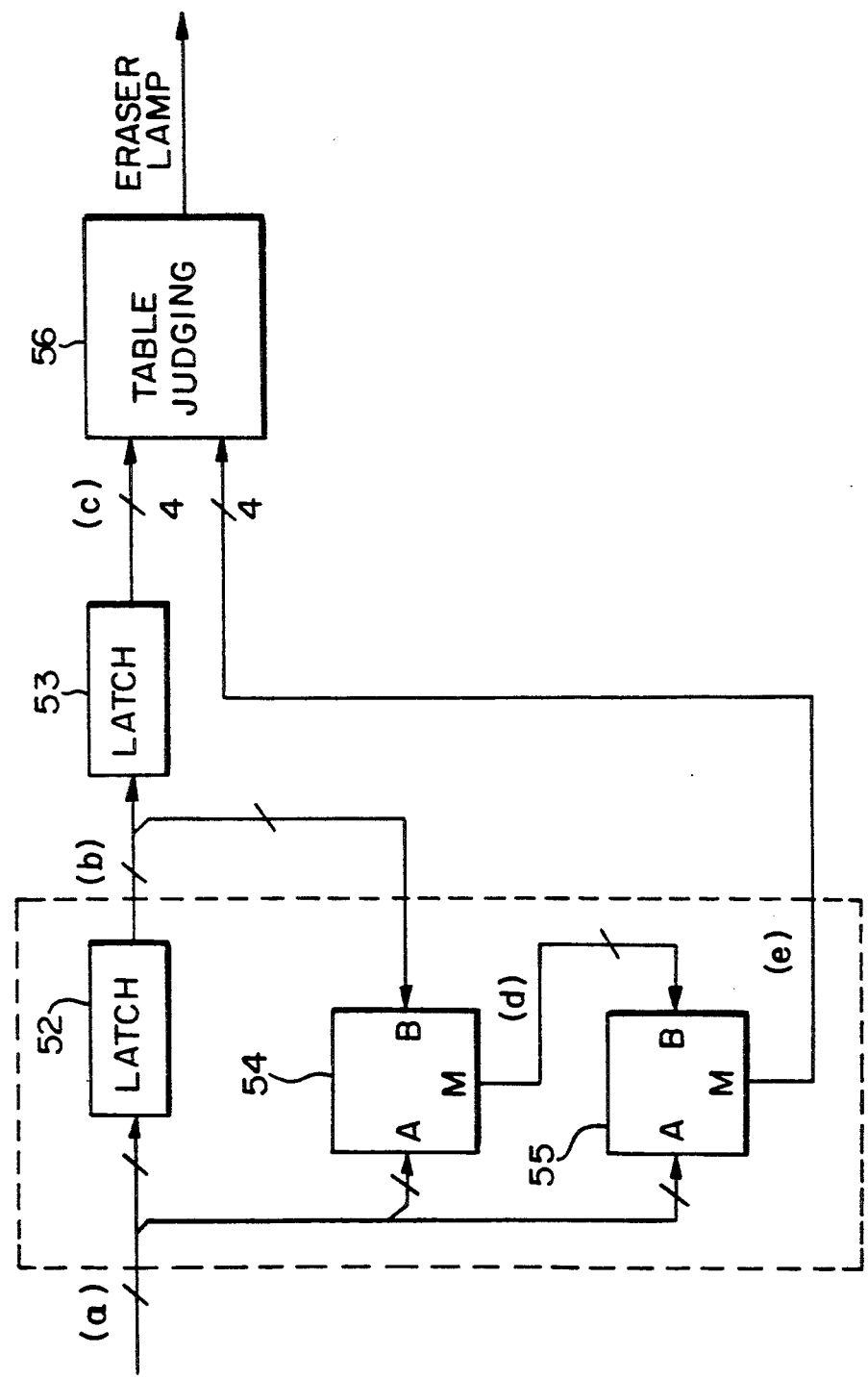

FIG. 6a

| 2 | 3 | 4 | 5 | 6 | 7 | 8 | 9 | 10 | 11 |

FIG. 6b

| 1 | 2 | 3 | 4 | 5 | 6 | 7 | 8 | 9 | 10 |

FIG. 6c

| 1 | 2 | 3 | 4 | 5 | 6 | 7 | 8 | 9 |

FIG. 6d

| 1+2 | 2+3 | 3+4 | 4+5 | 5+6 | 6+7 | 7+8 | 8+9 |

FIG. 6e

| 1+2+3 | 2+3+4 | 3+4+5 | 4+5+6 | 5+6+7 | 6+7+8 | 7+8+9 |

COLOR IMAGE FORMING METHOD AND APPARATUS FOR IMPROVED IMAGE COLOR REPRODUCIBILITY

BACKGROUND OF THE INVENTION

1. Field of the Invention

The present invention relates to an image forming apparatus, and more particularly, it relates to a color image forming apparatus which can form a color image by combining a plurality of colors.

2. Description of the Related Art

For example, an electrophotographic color copying machine comprises developing units of color toners in a plurality of different colors, such as four colors of cyan (C), magenta (M), yellow (Y) and black (BL), for example. A multicolor copy is obtained by color-separating an original through a plurality of optical color filters, developing the same with color toners corresponding to the colors of the optical color filters and overlappingly repeating such development on the same paper with different toners. Such a color copying machine is provided with a color sensor for reading an original image by electrical means in order to improve black color reproducibility, for example. A portion of the original image determined to be in black is subjected to single color development of only black, with no development in other colors (refer to U.S. Pat. No. 4,655,579).

In an actual color copying machine, however, such single color development is required only in those portions having a relatively high spatial frequency such as a line image of characters or the like. In a portion of a picture etc. having a low spatial frequency, on the other hand, it is preferable to perform development by overlapping a plurality of colors, in order to improve reproducibility of color tones, etc.

SUMMARY OF THE INVENTION

An object of the present invention is to improve the reproducibility of image colors in a color image forming apparatus.

Another object of the present invention is to perform proper image processing in response to features of pixel data of an original image in a color image forming apparatus.

Still another object of the present invention is to improve reproducibility of image colors in a method of forming a color image.

In order to attain the aforementioned objects, the inventive color image forming apparatus is adapted to form a color image in a plurality of colors in one aspect of the present invention and comprises a plurality of image forming means, spatial frequency detection means and control means. The plurality of image forming means are different in image forming color from each other. The spatial frequency detection means detects a spatial frequency relating to an image of a prescribed color for every portion of an image to be formed. The control means performs image formation by one of the image forming means in the image portion belonging to that high spatial frequency within portions to be subjected to image formation in the prescribed color and by overlapping a plurality of colors through at least two of the image forming means in a portion belonging to that having a low spatial frequency on the basis of a detection output from the spatial frequency detection means.

In order to attain the aforementioned objects, the inventive color image forming apparatus comprises a plurality of image forming means, discrimination means and control means in another aspect of the present invention. The plurality of image forming means are different in image forming color from each other. The discrimination means discriminates a line image portion from other portions in an image to be formed. The control means performs image formation by one of the image forming means in the line image portion and by overlapping a plurality of colors through at least two of the image forming means in other portions on the basis of a discrimination output from the discrimination means.

In order to attain the aforementioned objects, a method of forming a color image according to the present invention is adapted to form a color image in a plurality of colors, and comprises a step of reading an original image formed by a plurality of portions, a step of detecting a spatial frequency relating to an image of a prescribed color in every portion from the read original image and a step of performing development processing corresponding to the detected spatial frequency in every portion.

In the color image forming apparatus having the aforementioned structure, development processing of the portion is controlled on the basis of the high or low level of the spatial frequency, thereby to improve reproducibility of image colors.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram of a spatial frequency discrimination part shown in FIG. 3;

FIGS. 6a to 6e is an explanatory diagram showing the relationship between respective output signals from the spatial frequency discrimination part shown in FIG. 5;

DESCRIPTION OF THE PREFERRED EMBODIMENT

An embodiment of the present invention is now described with reference to the accompanying drawings.

Figure 1:
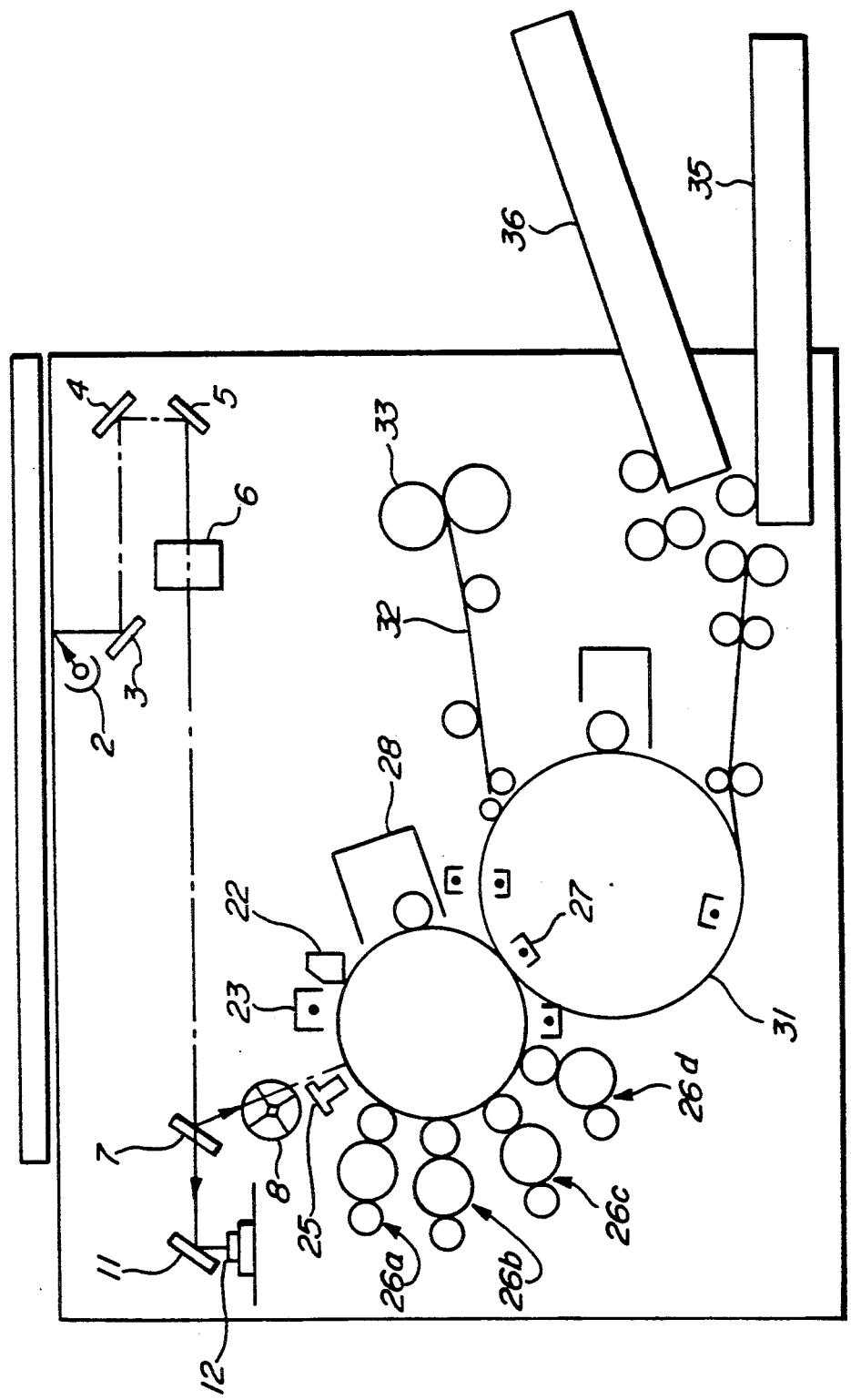
FIG. 1 is a schematic sectional view showing an analog color copying machine according to an embodiment of the present invention.

FIG. 1 is a sectional view schematically showing an analog color copying machine according to an embodiment of the present invention. An original set on a platen glass 1 is illuminated by an exposure lamp 2, so that light reflected by the same is further reflected by a mirror 7 through mirrors 3, 4 and 5 and a lens 6, and guided to a photosensitive drum 21 through color filters 8. Thus, an electrostatic latent image of the original is drawn on a photosensitive material provided on the photosensitive drum 21.

The color filters 8 are formed by red, green, blue and transparent filters, and one of these filters is selectively inserted in the optical path by a command from a control circuit as hereinafter described. The red filter mainly shields a light beam of cyan and the green filter mainly shields a light beam of magenta, while the blue filter mainly cuts a light beam of yellow and the transparent filter passes most of the light beams of all the colors.

On the other hand, light beams simultaneously transmitted through the mirror 7, which is a half mirror, are reflected by a mirror 11 and projected on a linear color CCD sensor 12, which is an image pickup element for reading color information. Thus, the image pickup element 12 can detect brightness of the original.

Image formation is performed by electrophotography. The photosensitive drum 21 is illuminated by a main eraser lamp 22 and charged by a charger 23 for every reproduction before exposure. The photosensitive drum 21 is exposed in this state so that an electrostatic latent image is formed on the same.

Then, in the case of development of black color, as hereinafter described, an eraser lamp 25 is lit if necessary, to partially erase the electrostatic latent image in response to image information previously read by the CCD sensor 12. This eraser lamp 25 is formed by an LED array. Then, one of developing units 26a to 26d respectively having yellow (Y), magenta (M), cyan (C) and black (BL) toners is selected to develop the electrostatic latent image formed on the photosensitive drum 21. The developed image is transferred by a transfer charger 27 onto a paper which is wound on a transfer drum 31. After such transfer operation, the residual part of the toner is collected by a cleaner 28.

Such process is repeated for at least one of yellow, magenta, cyan and black. Then the paper is separated from the transfer drum 31 through operation of a separation pawl (not shown), and the image is fixed on the paper through a feed path 32 and a fixing unit 33 and the paper is discharged to a discharge tray (not shown). At this time, the optical system repeats the scanning operation in synchronization with the operation of the photosensitive drum 21 and the transfer drum 31.

The paper is supplied from a paper cassette 35 or 36, and its forward end is chucked by a chucking mechanism (not shown) on the transfer drum 31, to be prevented from displacement in a transfer operation.

Figure 2:
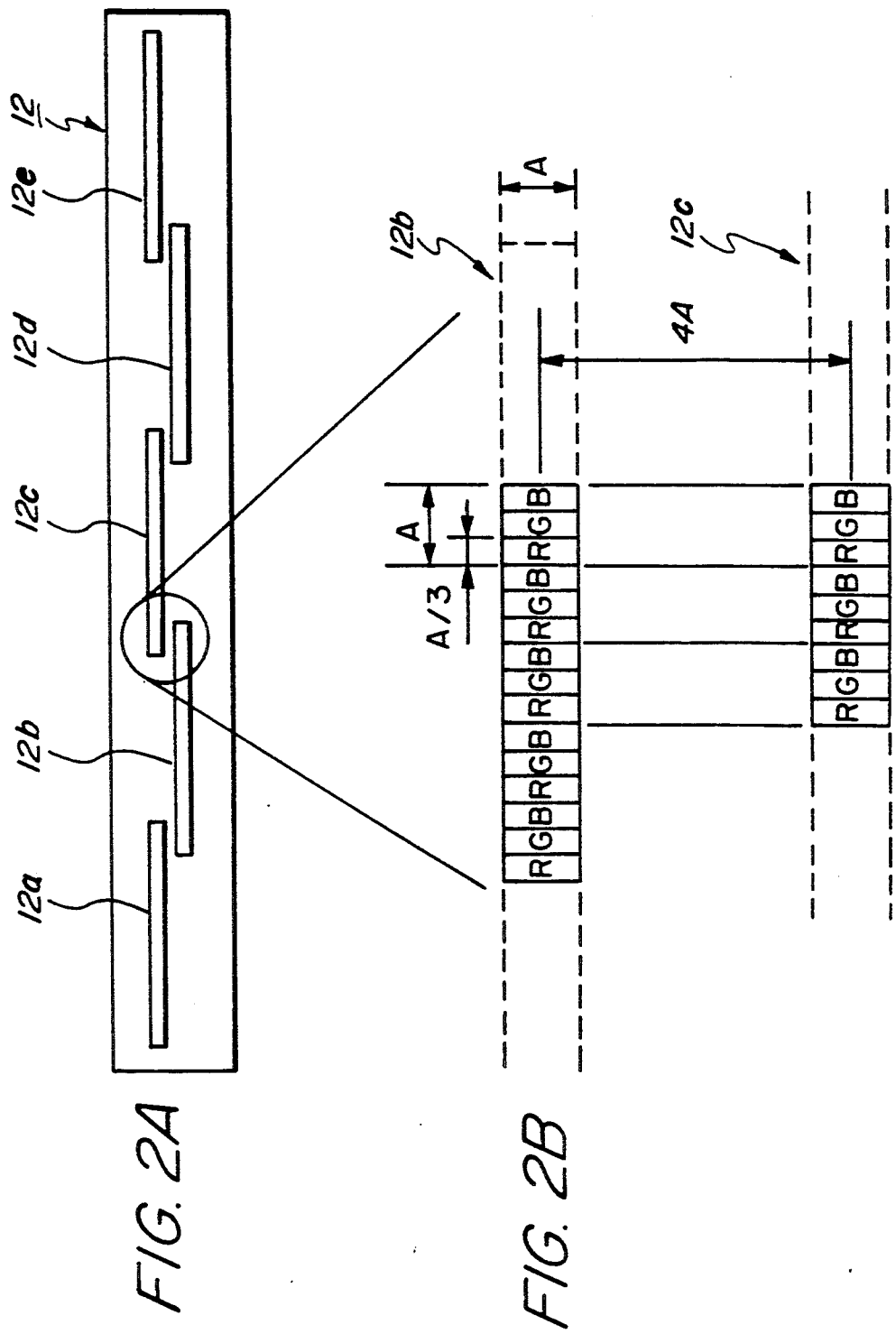
FIG. 2A is a plan view of a linear CCD sensor shown in FIG. 1.
FIG. 2B is an enlarged view of the linear CCD sensor shown in FIG. 2A.

FIG. 2A illustrates the linear color CCD sensor 12. This CCD sensor 12 is formed by five CCD sensor chips 12a to 12e, which are aligned in a staggered manner. Each of the chips 12a to 12e has 2964 effective pixels, and red (R), green (G) and blue (B) filters are deposited on each pixel, as shown in FIG. 2B. The chips 12a to 12e are alternately arrayed along the read direction to be spaced apart by four pixels, and each chip can store data for seven lines. The data are converted to data for one line by an analog data processing part (not shown).

Figure 3:
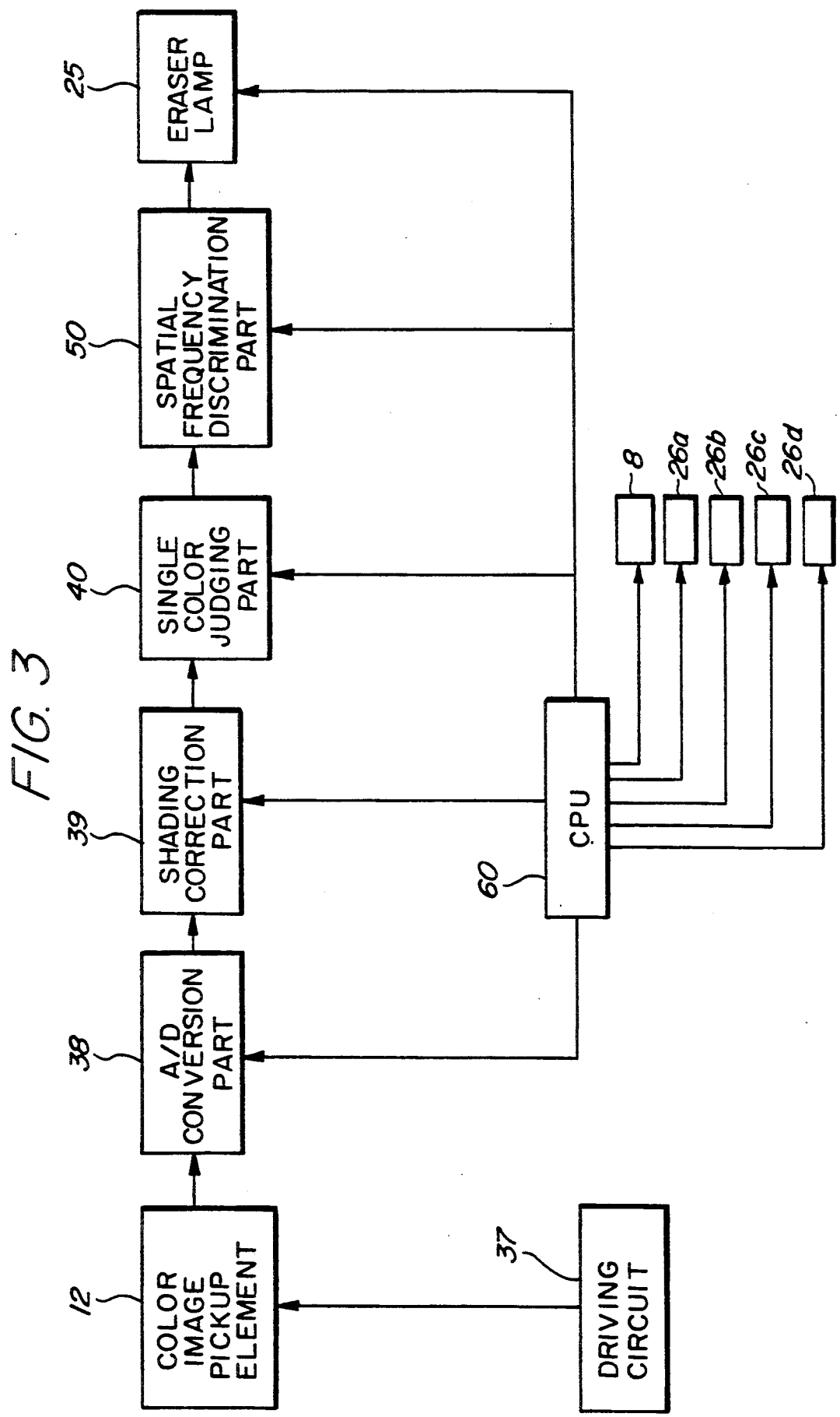
FIG. 3 is a schematic block diagram of a color processing part in the copying machine shown in FIG. 1.

FIG. 3 is a schematic block diagram of a control circuit including a color signal processing part of the color copying machine shown in FIG. 1.

Respective blocks are driven by control signals from a CPU 60, which is adapted to control the color copying machine, to sequentially process color signals. The linear CCD sensor 12, which is a color image pickup element, is driven by a driving circuit 37 to convert a color image formed on the linear CCD sensor 12 to electric signals. The converted electric signals are outputted in series in analog values, and converted to 6-bit digital signals by an A-D conversion part 38. A shading correction part 39 corrects distortion based on characteristics of the optical system, thereby to uniformalize levels of the digital signals. Then, a single color image signal selected in a single color judging part 40 by a signal from the CPU 60 is outputted to a spatial frequency discrimination part 50. A signal for lighting the eraser lamp 25 is outputted with respect to a portion corresponding to a specific pixel on the basis of a spatial frequency discriminated by the spatial frequency discrimination part 50. The CPU 60 is connected with the color filters 8 and the respective developing units 26a to 26d, to control switching of the color filters 8 and operation of the respective developing units 26a to 26d.

Figure 4:
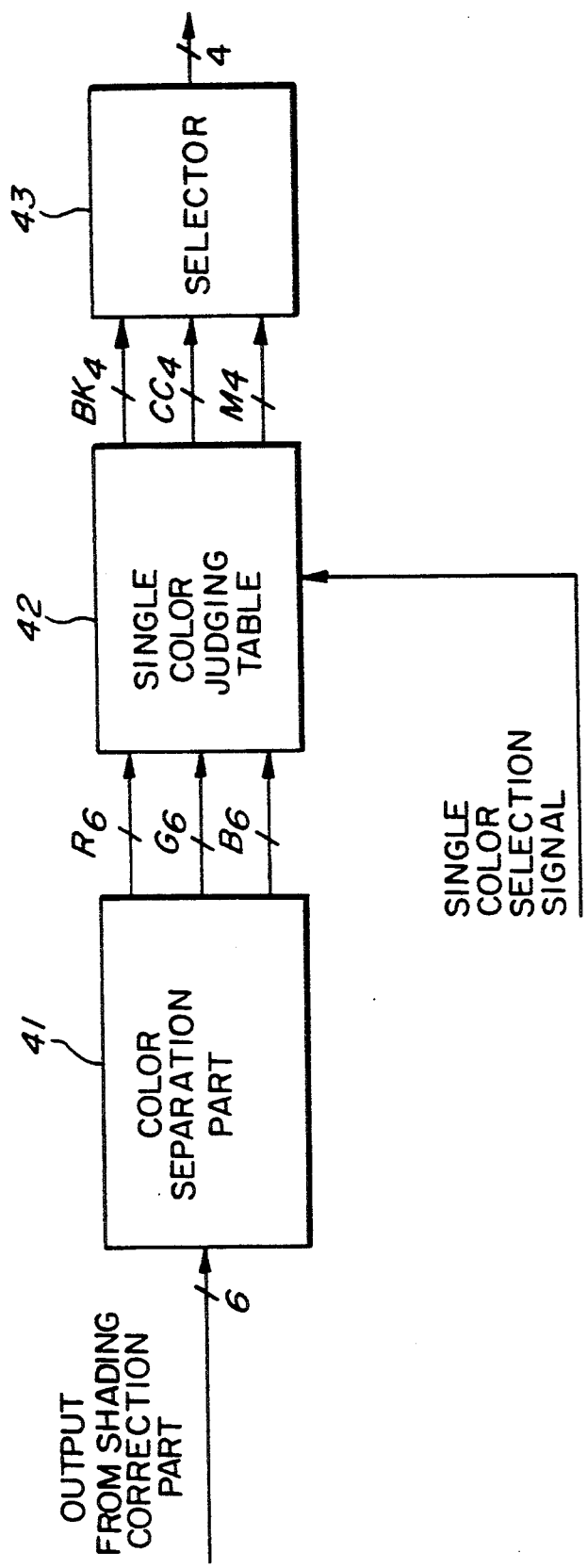
FIG. 4 is a block diagram of a single color judging part 40 shown in FIG. 3.

Operation of the single color judging part 40 and that of the spatial frequency discrimination part 50 are now described in detail on the basis of FIGS. 4 and 5, with reference to a developing mode of developing a character portion, which is a black portion of an original, with only the black developing unit 26d.

FIG. 4 is a block diagram of the single color judging part 40 shown in FIG. 3.

In the single color judging part 40, the 6-bit digital signals outputted from the shading correction part 39 of the front stage are separated by a color separation part 41 into signals corresponding to red (R), green (G) and blue (B) respectively, and outputted to a single color judging table 42. The single color judging table 42 judges the separated signals of R, G and B, so that a black (BL) signal, a cyan (C) signal and a magenta (M) signal, each of which is written with single color information corresponding to each judging level as a 4-bit digital signal, are outputted to a selector 43. The selector 43 outputs a prescribed color signal to the spatial frequency discrimination part 50 on the basis of a single color selection signal from the CPU 60. In the case of this example, the BL signal is outputted by the single color selection signal.

FIG. 5 is a block diagram of the spatial frequency discrimination part 50 shown in FIG. 3. The spatial frequency discrimination part 50 is formed by a smoothing filter 51 and a judging table 56.

The smoothing filter 51 is formed by two latches 52 and 53 and two adders 54 and 55. The BL signal (a), which is a 4-bit digital signal, is inputted in the adders 54 and 55 and the latch 52 of a front stage respectively. An output (b) of the latch 52 is inputted in the adder 54 and the latch 53 of a rear stage. An output (d) of the adder 54 is inputted in the adder 55, while an output (e) of the adder 55 and an output (c) of the latch 53 of the rear stage are respectively inputted in the judging table 56. FIG. 6 illustrates relations between the respective outputs (a) to (e) of the BL signal. The judging table 56 discriminates whether or not a portion outputting the BL signal is a line image by the difference between the output (e) which is sequentially averaged for every pixel to express an average of adjacent three pixels and the original output (c) which is not averaged. That is, it discriminates whether or not the spatial frequency of an image including the pixel outputting the BL signal is high. A BL pixel in a high spatial frequency is smoothed by the smoothing filter 51 with neighborhood pixels, which are not in black, whereby its data value is reduced so that the difference between the same and the original data value is great. On the other hand, the data value of a BL pixel in a low spatial frequency is not substantially changed after processing by the smoothing filter 51, and hence the difference between the same and the original data value is little. The judging table 56 compares a constant threshold value with the difference between the data values, to discriminate whether or not the spatial frequency of the image of the portion is high for every pixel.

Figure 7:
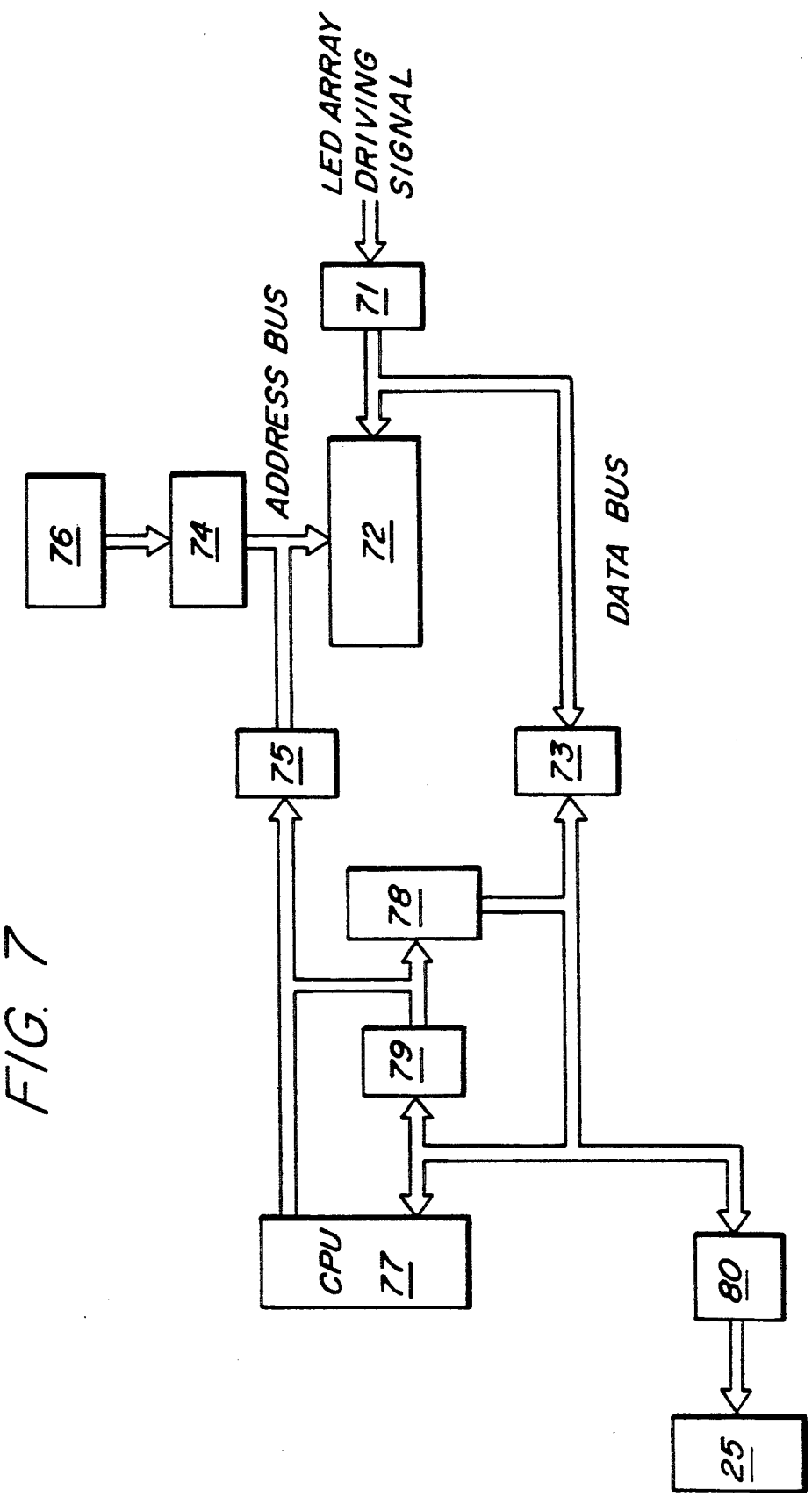
FIG. 7 is a block diagram of a control circuit for an eraser lamp shown in FIG. 3.

FIG. 7 is a block diagram of a control circuit for the eraser lamp 25 shown in FIG. 3.

A driving signal outputted from the spatial frequency discrimination part 50 shown in FIG. 3 for driving the LED array forming the eraser lamp 25 is inputted in a buffer 71 and then written in a RAM 72. The RAM 72 is adapted to store data for erasing pixel portions having high spatial frequencies for one page of the original. Buffers 71 and 73 are used for data lines for the RAM 72, while buffers 74 and 75 are used for address lines for the RAM 72. An address creation part 76 creates address signals of the RAM 72 in synchronization with input of the erase data in reading of the original. A CPU 77 is adapted to control the LED array, and executes side erasing and image-to-image erasing, as is well known in the art. The CPU 77 calls the erase data stored in the RAM 72 for executing the multicolor developing mode, to selectively control the LED array. Provided in addition are an external RAM 78 of the CPU 77, a latch 79 for latching low order addresses and a controller 80 for controlling the erase lamp (LED array) 25.

During the performance of color development by the yellow (Y), magenta (M) and cyan (C) toners, the eraser lamp 25 is lit for only a portion having a high spatial frequency according to the data stored by the RAM 72. That is, this portion is not subjected to the color development but is subjected to black development by single color development of black (BL). As to black portions, consequently, a portion having a low spatial frequency is reproduced in combination of the three colors of yellow, magenta and cyan and the portion having a high spatial frequency is reproduced only in black respectively.

Figure 8A:
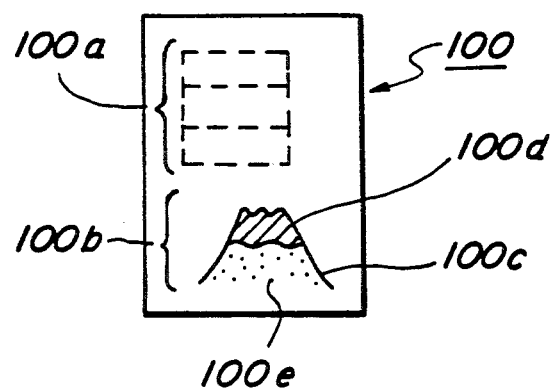
FIG. 8A illustrates an original to be copied, to which the embodiment of the present invention is applied.

Operation for color-copying an original 100 shown in FIG. 8A, for example, is now described.

In the original 100, a block 100a is a portion having a high spatial frequency on which black characters are written, and a block 100b is a portion on which a picture is drawn. It is assumed that an outline 100c and a portion 100d of the block 100b are drawn in black, and a portion 100e is drawn in a plurality of other colors.

In order to color-copy the aforementioned original 100 which is set on the platen glass 1, the original image is scanned and read by the linear CCD sensor 12, and the erase data for driving the erase lamp 25 is stored by the RAM 72. Then the original image is exposed on the photosensitive drum 21 which is uniformly charged by the charger 23 through the color filters 8, to form an electrostatic latent image. In this case, the blue filter is set as the color filters 8. The respective LEDs of the eraser lamp 25 are selectively lit for the electrostatic latent image thus formed, thereby to erase the electrostatic latent image in portions having high spatial frequencies. Consequently, the electrostatic latent image is erased in portions of the block 100a and the outline 100c, which have high spatial frequencies. Thereafter development is performed by the developing unit 26a with the yellow toner, and the yellow toner image is transferred onto a paper, which is wound on the transfer drum 31, by the transfer charger 27.

Thereafter similar operation is repeated by re-scanning the original 100. That is, a latent image formed through the green color filter 8 is developed by the developing unit 26b having the magenta toner and a latent image formed through the red color filter 8 is developed by the developing unit 26c having the cyan toner respectively, and respective toner images are overlappingly transferred onto the same paper which is wound on the transfer drum 31.

Through the aforementioned process, the toners of three colors of yellow, magenta and cyan are overlappingly transferred onto the portion 100d, which is a black image having a low spatial frequency.

Then a latent image formed through the transparent filter 8 by further re-scanning the original 100 is developed by the developing unit 26d having the black toner. In this case, the electrostatic latent image is erased in portions having low spatial frequencies by the eraser lamp 25. Thus, the electrostatic image is erased in the portions 100d and 100e having low spatial frequencies, so that only the characters written in the block 100a and the outline 100c, which are black images of portions having high spatial frequencies, are developed with the single black toner and transferred onto the paper which is wound on the transfer drum 31.

Figure 8B:
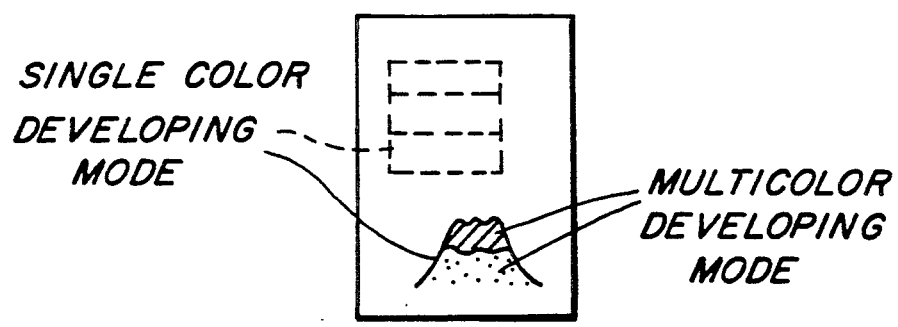
FIG. 8B illustrates a copy of the original shown in FIG. 8A made by the embodiment of the present invention.

Through the aforementioned steps, the block 100a and the outline 100c are developed in the single color developing mode while the portions 100d and 100e are developed in the multicolor developing mode, as shown in FIG. 8B.

Although only the portions having high spatial frequencies are developed with the single color toner as to the black portions of the original image in the above embodiment, similar processing can also be applied to colors other than black.

In the aforementioned embodiment, the spatial frequencies are detected with respect to the main scanning direction of the original image, i.e., the longitudinal direction of the color image sensor 12. However, it is also possible to store pixel lines of the main scanning direction read by the color image sensor 12 with respect to a plurality of lines thereby to also detect spatial frequencies in the subscanning direction (direction orthogonal to the main scanning direction) with respect to each pixel from a difference between an average value data of the same and corresponding pixels of neighborhood pixel lines and data specific to the pixel. The original image can be further densely processed if the apparatus is so formed as to perform image formation in a single color when the spatial frequency is judged to be high with respect to at least either the main scanning direction or the subscanning direction while performing image formation by overlapping a plurality of colors when the spatial frequencies are low in both directions.

As clearly understood from the above description of concrete means and action, the present invention is so structured that detection means detects spatial frequencies of an image to perform image formation in a single color in a portion having a high spatial frequency without overlapping a plurality of colors in image portions of a prescribed color while performing image formation by overlapping a plurality of colors in other portions. Thus, reproducibility of character images etc. with respect to the original is improved while fine difference of color information such as hues can be reproduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   means for detecting spatial frequencies relating to every pixel of an image to be formed in accordance with a difference in image density between each pixel and pixels adjacent thereto;
   image forming means including a plurality of developing means whose developing colors are different from each other;
   means for selecting developing means to be used on the basis of the detected spatial frequencies; and
   means for controlling said image forming means so as to form an image by said developing means selected by said selecting means.

2. An image forming apparatus comprising:
   means for detecting image density of every pixel of an image to be formed;
   means for calculating an average value of the image densities of plural pixels including pixels adjacent to an objective pixel;
   means for comparing the image density of the objective pixel and the calculated average value;
   image forming means including a plurality of developing means whose developing colors are different from each other;
   means for selecting the developing means to develop an image of the objective pixel in accordance with result of the comparison; and
   means for controlling said image forming means so as to form the image of the objective pixel by the developing means selected by said selecting means.

3. An image forming apparatus for forming a color image in a plurality of colors, said image forming apparatus comprising:
   a plurality of image forming means being different in image forming color from each other;
   spatial frequency detection means for detecting a spatial frequency relating to an image of a prescribed color for every portion of an image to be formed, wherein said spatial frequency detection means detects, with respect to each pixel of said image to be formed, the spatial frequency of a portion to which said pixel belongs on the basis of image information of said pixel and those adjacent thereto; and
   control means for controlling said image forming means to perform image formation by one of said image forming means in a portion of the image having a high spatial frequency within portions to be subjected to image formation in said prescribed color and by overlapping a plurality of colors through at least two of said image forming means in a portion of the image having a low spatial frequency on the basis of a detection output from said spatial frequency detection means.

4. An image forming apparatus in accordance with claim 3, wherein said spatial frequency detection means is provided with:
   arithmetic means for obtaining, with respect to each pixel of said image to be formed, a difference between an average value of pixel density data of said pixel and those adjacent thereto and pixel density data specific to said pixel, and
   comparison means for comparing the arithmetic result by said arithmetic means with a prescribed reference value with respect to each of said pixels,
   said control means controlling said image forming means to perform image formation by one of said image forming means with respect to a pixel having said arithmetic result exceeding said prescribed reference value and by overlapping a plurality of colors through at least two of said image forming means with respect to a pixel having said arithmetic result being lower than or equal to said prescribed reference value.

5. An image forming apparatus for forming a color image in a plurality of colors through an electrophotographic process, said image forming apparatus comprising:
   a plurality of image forming means being different in image forming color from each other, said image forming means including: a photosensitive member, and a plurality of developing units having developers of developing colors which are different from each other;
   photoelectric conversion means for optically reading an original image to be subjected to image formation, converting the same to an electric signal and outputting the same as an image signal including color formation;
   spatial frequency detection means for detecting a spatial frequency relating to an image of a prescribed color for every portion of an image to be formed, said spatial frequency detection means detecting, with respect to each pixel, the spatial frequency of said image of said prescribed color in a prescribed range to which said pixel belongs on the basis of said image signal outputted from said photoelectric conversion means;
   control means for controlling said image forming means to perform image formation by one of said image forming means in a portion of the image having a high spatial frequency within portions to be subjected to image formation in said prescribed color and by overlapping a plurality of colors through at least two of said image forming means in a portion of the image having a low spatial frequency on the basis of a detection output from said spatial frequency detection means;
   first optical means for projecting said original image on said photoelectric conversion means, and
   second optical means for projecting said original image on said photosensitive member.

6. An image forming apparatus in accordance with claim 5 wherein said second optical means includes:
   a plurality of color separation filters, and
   filter insertion means for selectively inserting each one of said color separation filters in an optical path for projecting said original image on said photosensitive member, and
   said image forming means include an eraser which can erase an electrostatic image in an arbitrary portion of said photosensitive member,
   said control means controlling said filter insertion means, said eraser and said developing units to develop a portion belonging to that having a spatial frequency higher than a prescribed reference value by one of said developing units within portions to be subjected to image formation in said prescribed color and to perform image formation by overlapping a plurality of colors through at least two of said developing units in a portion belonging to that having a spatial frequency lower than or equal to said prescribed reference value on the basis of detection results from said spatial frequency detection means.

7. An image forming apparatus comprising:

a plurality of image forming means, different in image forming color from each other;

discrimination means for discriminating a line image portion from other portions in a image to be formed, said discrimination means discriminating a portion having a relatively high spatial frequency from that having a relatively low spatial frequency for every portion of said image to be formed and outputting a detection result assuming that said portion having a high spatial frequency is said line image portion, said discrimination means being comprised of:

an arithmetic means for obtaining, with respect to each pixel of said image to be formed, a difference between an average value of respective pixel density data of said pixel and those adjacent thereto and pixel density data specific to said pixel, and a comparison means for comparing the arithmetic result from said arithmetic means with a prescribed reference value with respect to said each pixel;

control means for controlling said image forming means to perform an image formation by one of said image forming means in said line image portion and by overlapping a plurality of colors through at least two of said image forming means in said other portions on the basis of discrimination output from said discrimination means, said control means controlling said image forming means to perform image formation by one of said image forming means with respect to a pixel having said arithmetic result exceeding said prescribed reference value while performing image formation by overlapping a plurality of colors through at least two of said image forming means with respect to a pixel having said arithmetic result being lower than or equal to said prescribed reference value on the basis of the comparison result made by said comparison means.

8. A method for forming a color image in a plurality of colors, comprising the steps of:

reading an original image constituted by a plurality of portions, said original image consisting of a plurality of colors;

detecting density data of a pixel included in each said portion, detecting density data of pixels adjacent to said pixel, calculating an average value from respective said density data of said pixel and those adjacent thereto;

obtaining data of the difference between said density data of said pixel and said average value; and performing image forming processing corresponding to the obtained difference data of every said portion.

9. A method of forming a color image in accordance with claim 8 wherein said step of performing an image forming processing includes the steps of:

comparing said data of said difference with a prescribed reference value, and determining the type of said image forming processing on the basis of the result of comparison made in said comparing step.

10. A method for forming a color image in a plurality of colors comprising the steps of:

distinguishing images of a prescribed color from images of other colors to be formed;

detecting spatial frequencies relating to the distinguished images of every portion of an image to be formed;

forming an image of the prescribed color belonging to a portion having a high spatial frequency in only single color; and forming an image of the prescribed color image belonging to a portion having a low spatial frequency by overlapping a plurality of colors.

* * * * *